US008667505B2

(12) United States Patent
Woods et al.

(10) Patent No.: US 8,667,505 B2
(45) Date of Patent: Mar. 4, 2014

(54) MESSAGE QUEUE MANAGEMENT (75) Inventors: Shawn M. Woods, Seattle, WA (US);
Herman H Ng, Bellevue, WA (US);
Daniel James Plaster, Seattle, WA (US);
Alex J. Glover, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 256 days.

(21) Appl. No.: 12/882,000

(22) Filed: Sep. 14, 2010

(65) Prior Publication Data
US 2012/0066616 A1 Mar. 15, 2012

(51) Int. Cl.
*G06F 11/32* (2006.01)
*G06F 11/30* (2006.01)

(52) U.S. Cl.
USPC ............ 719/314; 719/313; 715/777; 715/779

(58) Field of Classification Search
None
See application file for complete search history.

(56) References Cited

U.S. PATENT DOCUMENTS

| 7,440,997 | B2 | 10/2008 | Colling et al. | |
|---|---|---|---|---|
| 8,261,286 | B1 * | 9/2012 | Fateev et al. ................. | 719/314 |
| 2005/0149952 | A1 | 7/2005 | Goodwin et al. | |
| 2005/0256858 | A1 * | 11/2005 | McArdle ........................... | 707/4 |
| 2005/0278726 | A1 * | 12/2005 | Cano et al. ..................... | 719/315 |
| 2006/0218238 | A1 * | 9/2006 | Critchley et al. ............. | 709/207 |
| 2006/0230321 | A1 * | 10/2006 | Cummins et al. ............... | 714/46 |
| 2009/0183155 | A1 * | 7/2009 | Praitis et al. .................. | 718/100 |
| 2009/0287824 | A1 | 11/2009 | Fisher et al. | |
| 2010/0064177 | A1 | 3/2010 | Li et al. | |

OTHER PUBLICATIONS

"Google Chrome crashes: Recover browser session after a Google Chrome crash", Retrieved from: <http://www.google.com/support/chrome/bin/answer.py?hl=en&answer=95268> on Aug. 27, 2010, (2010), 1 page.
"Session Restore", Retrieved from: <http://kb.mozillazine.org/Session_Restore>on Aug. 27, 2010, (Jun. 13, 2010), 3 pages.
Norman, George "Update for IE8 in Windows 7 RC Fixes Tab Hanging Issues", Retrieved from: <http://www.findmysoft.com/news/Update-for-IE8-in-Windows-7-RC-Fixes-Tab-Hanging-Issues/> on Aug. 27, 2010, (May 6, 2009), 3 pages.
Zeigler, Andy "Tab Isolation", Retrieved from: <http://blogs.msdn.com/b/ie/archive/2010/03/04/tab-isolation.aspx> on Aug. 27, 2010, (Mar. 4, 2010), 2 pages.
International Search Report, Mailed Date: Mar. 28, 2012, Application No. PCT/US2011/050470, Filed Date: Sep. 6, 2011, pp. 10.

* cited by examiner

*Primary Examiner* — Stephen Hong
*Assistant Examiner* — Keith Bloomquist
(74) *Attorney, Agent, or Firm* — Andrew Sanders; Micky Minhas; Wolfe-SBMC (57) ABSTRACT

Various embodiments provide message queue management techniques designed to reduce the likelihood of multi-component applications becoming nonresponsive and enable recovery options for individual components if they do become nonresponsive. In at least some embodiments, a message queue manager detects when a component of an application interface becomes nonresponsive and detaches the component from a shared message queue. The shared message queue can continue to process messages for other responsive components while messaging for the nonresponsive component is managed via a separate queue. The message queue manager can also notify a user regarding the nonresponsive component and provide the user with options to facilitate recovery of the nonresponsive component. Further, in at least some embodiments, the message queue manager can monitor a detached component and reattach the detached component when it becomes responsive again.

21 Claims, 5 Drawing Sheets

MESSAGE QUEUE MANAGEMENT

BACKGROUND

Multi-component application programs, such as a tabbed web browser, are popular with users because they are a convenient way to interact with multiple resources (e.g., documents, web pages, files, etc.) at the same time through a single application. Traditionally, applications that make use of multi-components employ a shared input message queue to handle message processing and sequencing for the multiple components. Unfortunately, under the traditional approach, if one component becomes unresponsive, the component stops processing its messages from the shared queue. This can cause a disruption of messages for the other components that share the same message queue. Thus, one unresponsive component can effectively block the queue and cause the other components to become unresponsive as well.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide message queue management techniques designed to reduce the likelihood of multi-component applications becoming nonresponsive (e.g., "locking-up", "hanging", "crashing", etc.) and enable recovery options for individual components if they do become nonresponsive. In at least some embodiments, a message queue manager can be implemented to detect when a component of an application becomes nonresponsive and detach the component from a shared input message queue. The shared queue can continue to process messages for other responsive components, while messaging for the nonresponsive component is managed via a separate queue. The message queue manager can also notify a user regarding the nonresponsive component and provide the user with options to facilitate recovery of the nonresponsive component. Further, in at least some embodiments, the message queue manager can monitor a detached component and reattach the detached component when it becomes responsive again.

BRIEF DESCRIPTION OF THE DRAWINGS

The same numbers are used throughout the drawings to reference like features.

DETAILED DESCRIPTION

Overview

Various embodiments provide message queue management techniques designed to reduce the likelihood of multi-component applications becoming nonresponsive (e.g., "locking-up", "hanging", "crashing", etc.) and enable recovery options for individual components if they do become nonresponsive. In a browsing environment, a message queue manager can be implemented to manage tabs for a tabbed browser user interface. In at least some embodiments, the message queue manager can detect when a component (e.g., a tab) of an application becomes nonresponsive and detach the component from a shared input message queue. The shared queue can continue to process messages for other responsive components while messaging for the nonresponsive component is managed via a separate queue. The message queue manager can also notify a user regarding the nonresponsive component and provide the user with options to facilitate recovery of the nonresponsive component. Further, in at least some embodiments, the message queue manager can monitor a detached component and reattach the detached component when it becomes responsive again.

In the discussion that follows, a section entitled "Operating Environment" is provided and describes one environment in which one or more embodiments can be employed. Following this, a section entitled "Message Queue Management" describes example techniques for managing a message queue for multi-component applications in accordance with one or more embodiments. Next, a section entitled "Example Web Browser" describes examples of a tabbed web browser interface, notifications, and recovery options in accordance with one or more embodiments. Then, a section entitled "Example Method" describes example techniques and features related to message queue management in the context of an example method. Last, a section entitled "Example System" describes an example system that can be utilized to implement one or more embodiments.

Operating Environment

Figure 1:
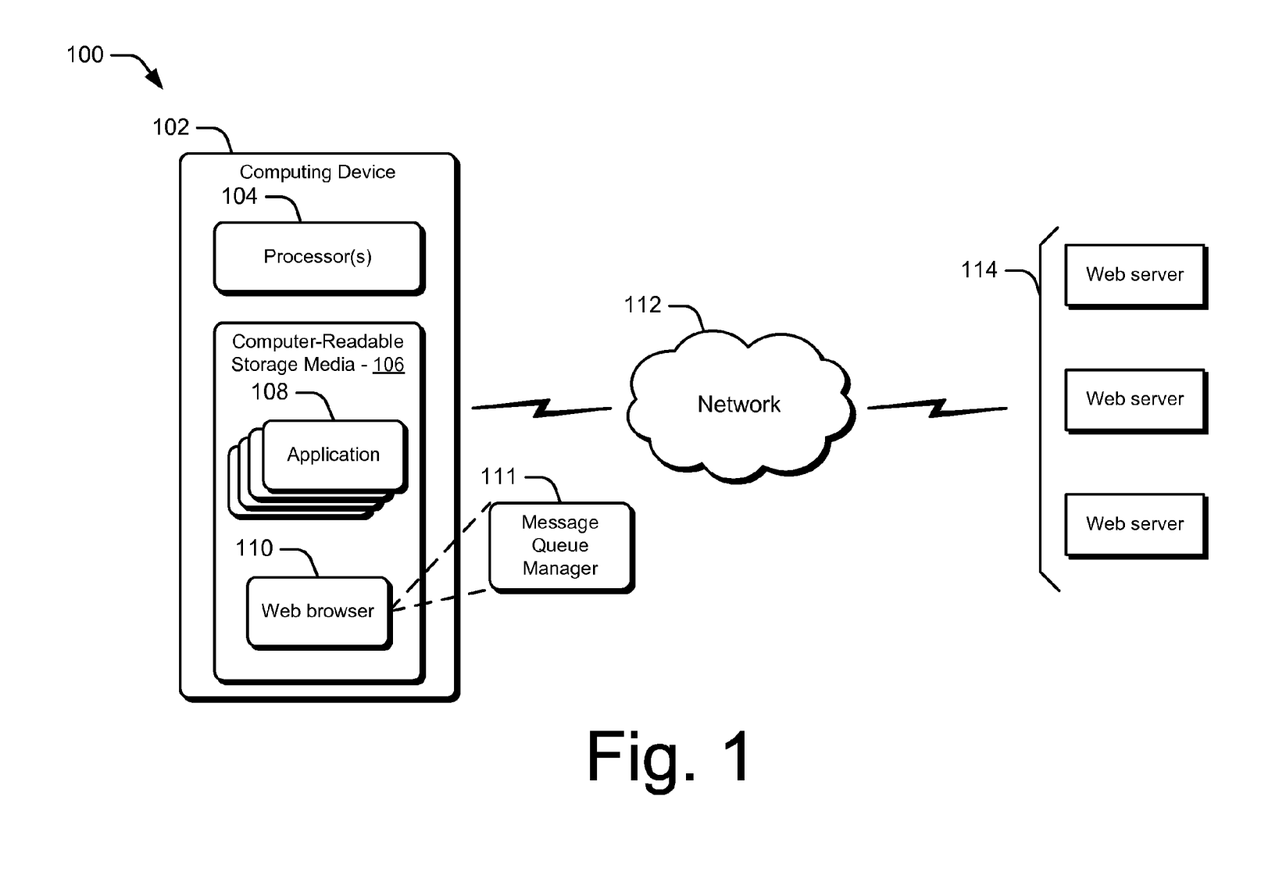
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 5.

In addition, computing device 102 includes a software application in the form of a web browser 110 that includes or otherwise makes use of a message queue manager 111 that operates as described above and below. The message queue manager can be configured to provide management for components of a multi-component application to resist and recover from crashes/hangs due to a nonresponsive component. In a tabbed browsing environment, the message queue manager is operable to manage one or more input message queues for multiple tabs of the web browser 110. In at least some embodiments, the message queue manager can detect when a component (e.g., tab) of an application becomes nonresponsive and detach the component from a shared input message queue. By so doing, message processing for the nonresponsive component can be handled by a separate "detached" message queue. This enables the shared queue to continue to process messages for other responsive components of the application so that interaction with the responsive components can continue. The message queue manager can also notify a user regarding the nonresponsive component and provide the user with options to facilitate recovery of the nonresponsive component. Further, in at least some embodiments, the message queue manager can monitor a detached component/tab and reattach the detached component when it becomes responsive again.

Various examples are described herein in the context of a browsing environment and tabs for a web browser or other application. It is to be appreciated, though, that the message queue manager 111 and corresponding techniques can be employed in a variety of environments and with any suitable applications that make use of multiple components. By way of example and not limitation, the message queue manager can be implemented to manage components for various applications 108 including, but not limited to: an email application, desktop productivity applications, game applications, media applications, and/or other suitable applications of a computing device 102.

In addition, environment 100 includes a network 112, such as the Internet, and one or more web servers 114 from and to which content can be received and sent, as described above and below. Such content can include web pages that are received from the web servers.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of some example embodiments that can utilize the message queue manager 111.

Message Queue Management

Figure 2:
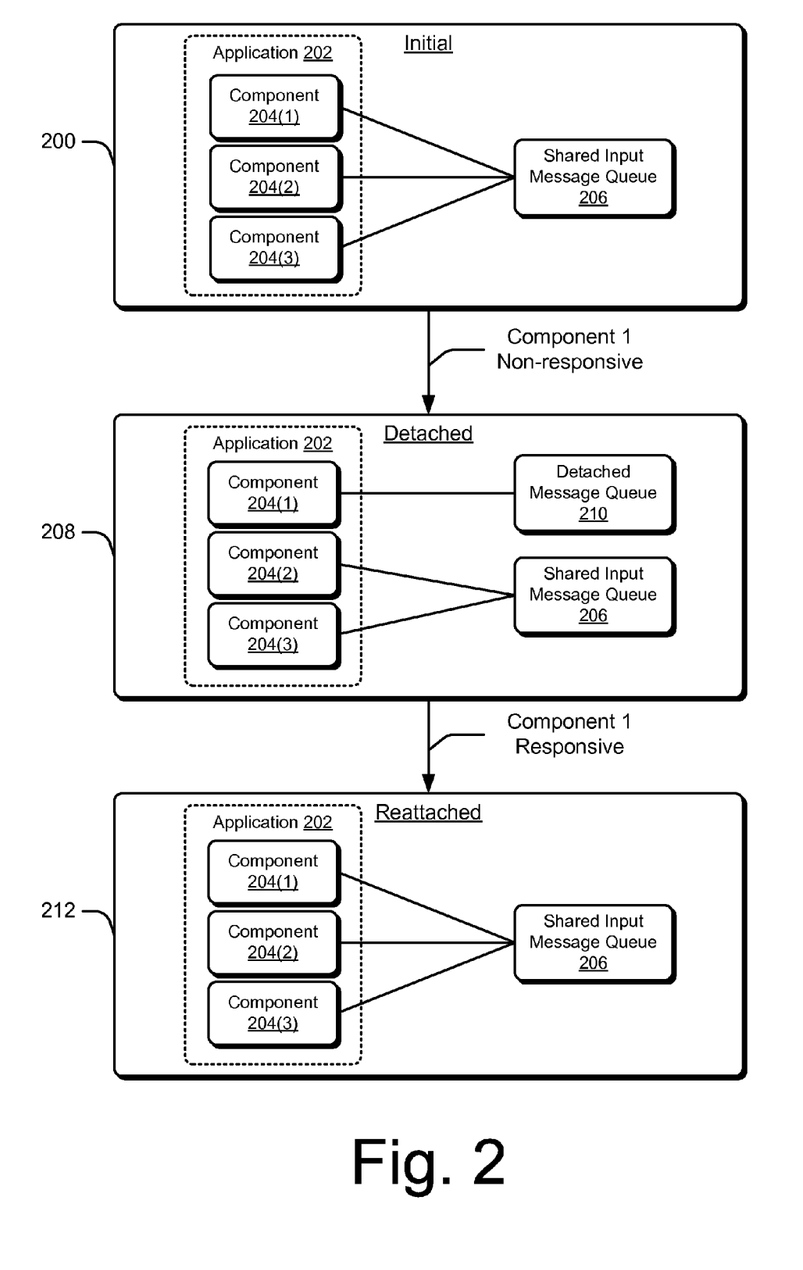
FIG. 2 illustrates a representation of example message queue management techniques for a multi-component application in accordance with one or more embodiments.

FIG. 2 illustrates a representation of example techniques for message queue management of a multi-component application in accordance with one or more embodiments. In particular, FIG. 2 represents transitions between different states associated with a message queue that can be performed by a suitably configured computing device, such as the example computing device 102 of FIG. 1 that includes or otherwise makes use of a message queue manager 111.

At state 200, an instance of a multi-component application 202 having multiple components 204(1)-204(3) is initially configured to use a shared input message queue 206. In this state, messages for each of the example components 204(1)-204(3) are sequenced and handled via the shared input message queue 206.

As used herein, a multi-component application is an application that enables user interaction with multiple resources (e.g., web pages, documents, files, scripts, media content, and so forth) via separate distinct portions or "components" of an interface for the application. In this context, the term components can refer to different, separately navigable and/or operable portions of a multi-component application. The components can be separate sub-applications that are contained within a common main window or frame of a parent application. Thus, an interface that makes uses of multiple components can be contained within a single window for the application. The components can be considered semi-autonomous in that the components may be part of the same application, but user interaction through one component can be independent of user interaction through the other component. Different components can be selectively exposed alternatively via a common display portion and/or simultaneously in different distinct areas of a user interface. A shared queue can be employed to synchronize and coordinate the different multiple semi-autonomous components so that they behave as a single component.

A variety of examples of multi-component applications are contemplated for which message queue management described herein can be employed. As mentioned, a tabbed web browser configured to enable multiple tabs is one example of a multi-component application. Tabs can also be used in other contexts such as for a word processing application, an email client, or a multi-media application. In another example, an application such as an office productivity suite can be configured to have different tabs, sections, columns or other components to facilitate interaction with multiple resources including text documents, web pages, spreadsheets, graphs, and so forth.

When message queue manager 111 (FIG. 1) detects that a component has become nonresponsive, message queue manager 111 can respond by causing the nonresponsive component to be detached from the shared input message queue 206. For example, assume that for some reason component 204(1) hangs or otherwise becomes unresponsive. The message queue manager 111 can detect that component 204(1) is unresponsive in any suitable way, examples of which are discussed above and below. In response to the detection, message queue manager 111 can operate to detach component 204(1) from the shared input message queue.

In particular, the nonresponsive component 204(1) can be detached as represented by detached state 208 in FIG. 2. As depicted, a detached message queue 210 can be associated with the nonresponsive component 204(1) and can be employed to manage messaging for the component 204(1). Component 204(2) and component 204(3) can continue to use the shared input message queue 206. Thus, messages for a nonresponsive component can be handled by a detached message queue 210. The shared input message queue 206 can continue to process messages for other responsive components so that the entire application does not become unresponsive due to a disruption caused by an individual component. In at least some embodiments, the message queue manager 111 can be configured to create the detached message queue 210 on demand and assign the queue for dedicated use by a component. This can occur in response to detecting that the component is unresponsive. Messages for the component can then be migrated to the newly created queue. Additionally or alternatively, the message queue manager 111 can be configured to make use of a pre-existing detached message queue to handle nonresponsive components as needed. A pre-existing detached message queue can be used repeatedly for different components if and when the components become unresponsive. In this case, the message queue manager 111 can initialize the pre-existing detached message queue before each use and/or clear the queue following each use to prepare the queue for the next use.

When the message queue manager 111 detects that responsiveness has been restored to a component that is detached, the message queue manager 111 can respond by causing the nonresponsive component to be reattached to the shared input message queue 206. For example, assume that component 204(1) is detached as described above for a period of time and then becomes responsive once again. The message queue manager 111 can detect that component 204(1) is responsive once again in any suitable way, examples of which are discussed above and below. In response to the detection, the message queue manager 111 can operate to reattach component 204(1).

In particular, the nonresponsive component 204(1) can be reattached as represented by reattached state 212 in FIG. 2. As depicted, the separate component message queue 210 has been closed or otherwise removed. In the reattached state 212, messaging for the component 204(1) is again being handled by the shared input message queue 206. This can involve merging messages for the component 204(1) back with messages for component 204(2) and component 204(3) in the shared input message queue 206. Further details regarding techniques that can be employed to detach and reattach a component from a shared input message queue can be found in a section below entitled "Example Method."

Having described examples of message queue management, consider now a discussion of an example web browser that can utilize the message queue manager 111 in accordance with one or more embodiments.

Example Web Browser

Interface

Figure 3:
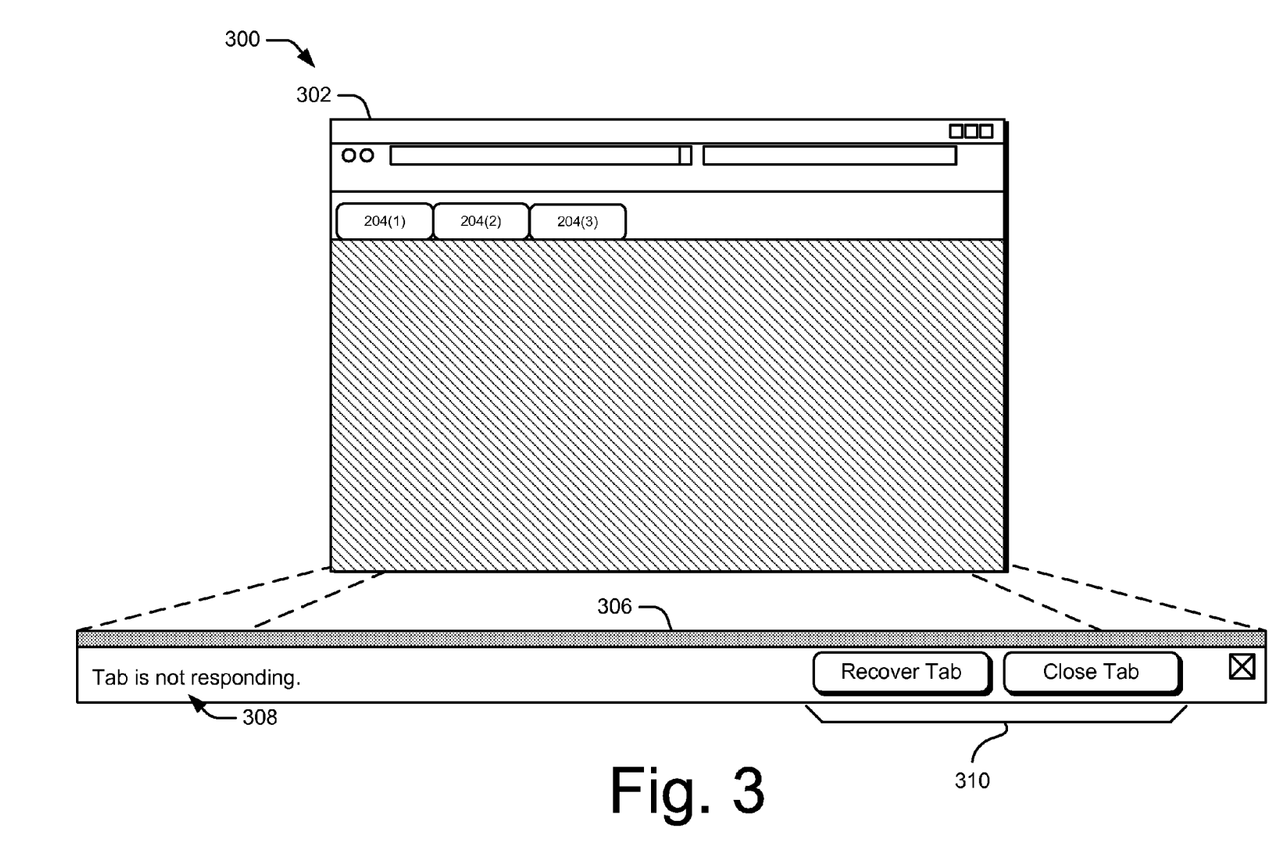
FIG. 3 illustrates an example web browser in accordance with one or more embodiments.

FIG. 3 illustrates an example web browser, in accordance with one or more embodiments, generally at 300. The depicted web browser is but one example of an application that can make use of multiple components (e.g., tabs) and a message queue manager 111 (FIG. 1) to facilitate management of the components. The web browser 300 includes a web browser user interface 302 which includes typical instrumentalities such as back and forward navigation buttons, an address bar, a search bar, and a tab band that can support multiple tabs. For instance, multiple tabs appear in the tab band shown in FIG. 3. The tabs are designated as components 204(1)-204(3) to indicate that the components discussed in relation to FIG. 2 can correspond to tabs, such as the example tabs of FIG. 3. The web browser user interface also includes a content rendering area 304 (designated by the cross hatching) in which content can be rendered. In addition, web browser user interface 302 includes a notification bar 306. In one or more embodiments, the notification bar is designed to help users maintain focus on their browsing activities, while offering notifications in the form of suggestions. Notifications presented via the notification bar can include notifications related to nonresponsive tabs that are output or otherwise caused via operation of the message queue manager 111 to enable various techniques for message queue management.

In at least some embodiments, the notification bar is nonmodal and is presented at a location within the browsing field-of-view that is selected to reduce user distraction. For example, in the illustrated and described embodiment, the notification bar is presented at or near the bottom of the web browser's user interface—here adjacent the bottom of or below content rendering area 304. The notification bar is designed to be noticeable yet ignorable, thus enabling a user to continue with their browsing tasks in content rendering area 304, without being distracted by a modal dialog. Further, in at least some embodiments, the notification bar is presented in a manner that overlays content that is rendered by the web browser. Thus, the notification bar's location effectively prioritizes content that is rendered within content rendering area 304 over a particular notification that might appear in the notification bar.

Notifications

Notifications regarding nonresponsive components can be configured in any suitable way. Suitable notifications can include a pop-up dialog box, an html page rendered by the web browser 300 or other application, a tab alert of a tabbed user interface, a notification presented via the notification bar 306, and/or combinations thereof. A notification can be configured to include one or more user selectable instrumentalities to perform recovery directly and/or through a separate recovery dialog that is accessible through the notification. A recovery dialog can be configured to provide additional information regarding a crash and/or various available recovery options.

For instance, the notification bar 306 in FIG. 3 is depicted as displaying an example notification regarding a nonresponsive component. In particular, the message queue manager 111 can cause a notification to be presented responsive to detecting that a tab of the example browser 300 is nonresponsive. The notification can be configured to appear across a corresponding tab. Thus, a notification that corresponds to a tab in the background may not appear until a user selects the background tab as the active tab. This approach can limit disruption of the user's browsing or other interaction with the active tab.

In the illustrated example, the notification includes an information portion 308 that indicates "Tab is not responding." The information portion can also identify a page name, URL, domain name, and/or other identifiers associated with a nonresponsive component to identify the source of the crash. For instance, the message queue manager can parse a domain string for a web resource to determine a domain name and configure a notification regarding a nonresponsive tab to indicate the domain name, such as indicating that "Foo.com is not responding." Optionally, the notification can also include one or more user-selectable instrumentalities, such as the illustrated buttons shown generally at 310 that are configured to provide various options for recovery of a nonresponsive tab or other component. For instance, the example buttons of FIG. 3 include a "Recover Tab" button that when selected can be configured to perform actions directly through the notification to recover the tab. Example actions can include reloading the page, stopping script that is executing in association with the tab, rolling back to a previous resource or URL in the browsing history, and so forth. Additionally or alternatively, the "Recover Tab" button can expose another dialog or interface through which the user can obtain more detailed information regarding the nonresponsive tab and/or select the various recover options. The example buttons further include a "Close Tab" button that a user can select to close out the nonresponsive tab.

Recovery Options

As noted above, various options to recover a nonresponsive tab or other component can be made available via user selectable instrumentalities included with a notification and/or through a recovery dialog having various selectable recovery options. Recovery options can be made available through typical instrumentalities such as menu item options, a toolbar, keyboard short-cuts, buttons, and so forth.

Consider now details regarding a few example recovery options that can be made available when a nonresponsive tab is detected. An option can be provided to close the tab. Thus, a user can simply select to stop interacting with a nonresponsive tab. Further, an option can be provided to restore the tab. Selection of the restore option can cause the web browser to attempt to reload and/or re-navigate to a selected resource (e.g., page, document, website, etc.).

Another option enables a user to perform a swap between resources associated with components that are nonresponsive. The swap effectively hides and/or kills the nonresponsive component and creates a new component having the new resource to replace the nonresponsive one. The swap can be performed in the background transparently to the user. From the user's perspective it appears as though a new resource was selected and presented through the component.

For instance, a button or other instrumentality can be provided that, when selected, automatically navigates a nonresponsive tab to another web page. The other web page can be a pre-designated default page or home page. Additionally or alternatively, the user can initiate a swap by inputting or select another resource in various ways, such as by selecting a link from a favorites list, typing a new address in the address bar of a web browser, selecting a navigation button such as a "back" or "home" button, and so forth. When selection of another resource occurs for a nonresponsive tab, message queue manager 111 can detect this and automatically initiate a swap, which hides or kills the nonresponsive tab, creates a new tab directed to the newly selected resource, and seamlessly replaces the nonresponsive tab with the new tab.

Additionally, a script recovery option can be provided to enable a user to stop execution of script that may be the cause of the nonresponsive tab. For example, when the message queue manager 111 detects a nonresponsive tab, a check can be made to ascertain whether script associated with the tab is being executed. If script is identified, the message queue manager 111 can inform the user using a notification as described above and below. The notification can also include a button or other user selectable instrumentality that, when selected, causes the script to stop executing. If script has caused a tab to be nonresponsive, stopping the script as soon as possible in the manner described may quickly restore responsiveness to the tab and limit the disruption of the user's browsing.

It should also be noted that a "self-recovery" option can also be implemented to enable the message queue manager 111 to perform recovery automatically without any user intervention. Under this option, the message queue manager 111 can determine that a nonresponsive component has become responsive again. The determination can occur independent of user action, such as being independent of user selection of a recovery button or interaction with a recovery dialog. When the message queue manager 111 determines that responsiveness is restored, the message queue manager 111 can operate automatically to reattach the component to the queue, render data corresponding to the component in a display portion such as in content rendering area 304 of FIG. 3, and dismiss a corresponding notification if appropriate. The "self-recovery" approach can be implemented to avoid disrupting a user with notifications and/or recovery options for components that recover on their own, which is often the case.

Having considered an example web browser that makes use of multiple tabs and a notification bar in accordance with one or more embodiments, consider now some further details regarding message queue management that are described in the context of an example method.

Example Method

Figure 4:
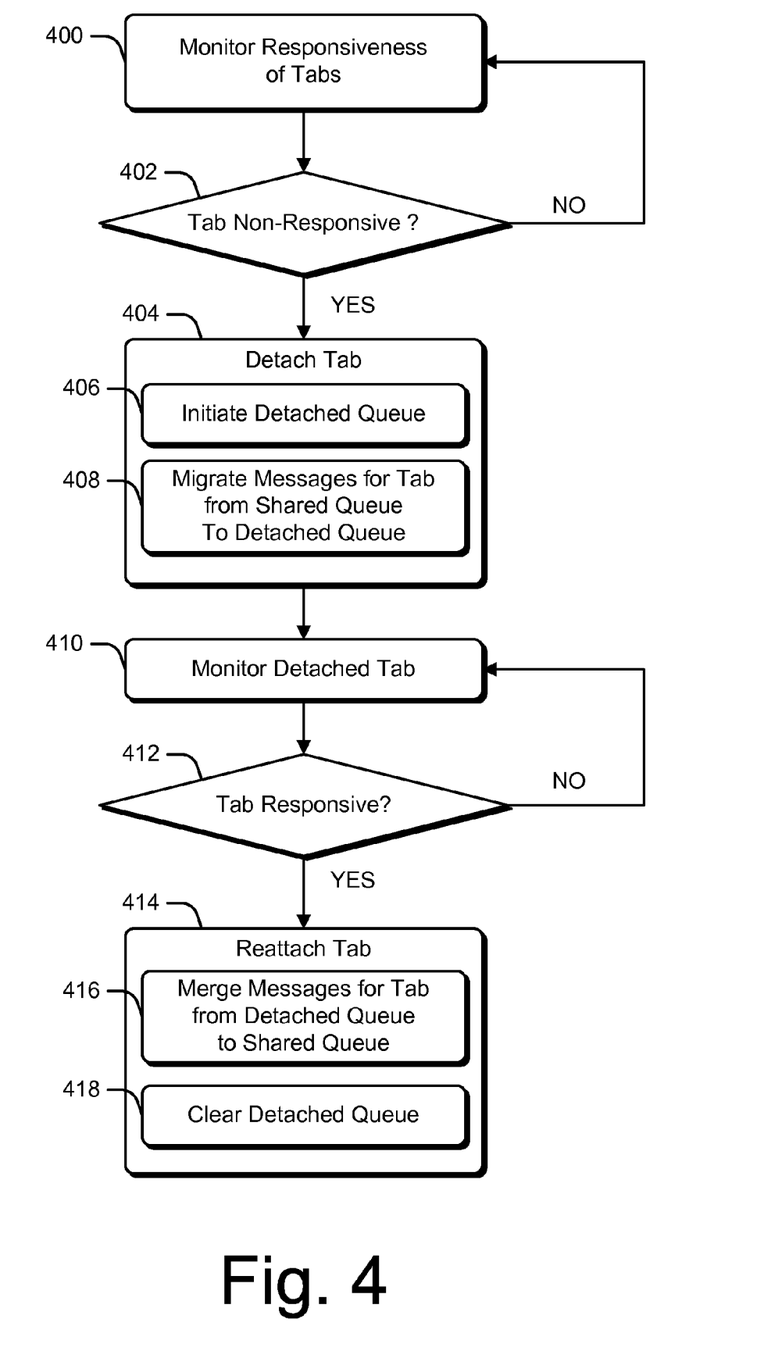
FIG. 4 is a flow diagram that describes steps of a method in accordance with one or more embodiments.

FIG. 4 is a flow diagram that describes steps of a method in accordance with one or more embodiments. The method can be implemented in connection with any suitable hardware, software, firmware, or combination thereof. In at least some embodiments, the method can be implemented by way of a suitability configured computing device, such as the example computing device 102 of FIG. 1 that includes or otherwise makes use of a message queue manager 111.

Recall that in an initial state, a multi-component application, such as a tabbed web browser, can make use of a shared input message queue to handle messages for each of the components. In a particular example, a web browser can have multiple tabs that operate independently and can be employed to access different resources from web servers. Thus, each tab can be navigated to point to a different resource or URL and present corresponding content. In an initial state, the web browser can be configured to use a shared input message queue to manage each tab. For instance, each new tab can be assigned to the shared queue by default.

The message queue manager 111 can be implemented to monitor the tabs to make sure the tabs remain responsive. In particular, step 400 monitors responsiveness of tabs of an application, such as for the example web browser. Based on the monitoring, step 402 determines if tabs become nonresponsive.

Monitoring of tabs can occur in any suitable way. One way that monitoring of tabs can occur is by sending a periodic "heartbeat" message to the tabs. In other words, the message queue manager 111 can be configured to poll each of the tabs with a heartbeat message. The heartbeat message can be configured as a basic request message that causes the tabs to send a reply message. Thus, the message queue manager 111 can monitor whether tabs send reply messages. A tab that is responsive will respond to the message and the message queue manager 111 can conclude that the tab is responsive. If a tab fails to respond to the heartbeat message, though, the message queue manager 111 can conclude that the tab is unresponsive.

In another example technique for monitoring, resources can be configured to push a message to the message queue manager 111 to notify the message queue manager 111 that they are responsive. This approach, although suitable, can involve reconfiguring resources with code that enables the pushed messages. Accordingly, using a heartbeat message to poll tabs as described can be more effective, less costly, and less complex than the pushed message approach—although both are viable approaches. If no tabs are detected as nonresponsive per step 402, the monitoring performed in step 400 can continue. It is to be appreciated that the monitoring of step 400 continues even in the presence of a non-responsive tab, even though it is not explicitly depicted in the figure.

When a nonresponsive tab is detected, step 404 can detach the tab. In particular, a nonresponsive tab can be detached from a shared input message queue used by a web browser or other application. To perform the detachment, step 406 initiates a detached queue. For instance, the message queue manager 111 can create or otherwise obtain a queue to handle messages for the nonresponsive tab in any suitable way. This can involve creating a new queue on demand and/or preparing a pre-existing queue for use by the nonresponsive tab. The initialization creates an association between the queue and the nonresponsive tab.

Once a suitable detached queue is initialized, step 408 migrates messages for the tab from the shared queue to the detached queue. This can include moving messages between the queues and making sure the messages are sequenced correctly. For instance, messages can be associated with sequencing information, such as timestamps and/or priorities that can be used to sequence the messages in an input queue. Messages can also include targeting information such as message numbers, a source name, and/or process IDs that can be used to direct a message to an appropriate tab.

To perform migration of messages associated with a particular nonresponsive tab, the message queue manager 111 can examine targeting information to identify and select messages to be moved to the detached queue. Sequencing information associated with the messages that are moved can be employed to preserve message sequence and/or re-order the message in the detached queue if appropriate. The tab can now be considered detached and message processing for the detached tab can be performed using the detached queue. At the same time, the shared input message queue can continued to be used to handle messages for the other "responsive" tabs. Messages that are kept in the shared input message can also be re-ordered as appropriate using sequencing information.

Once a tab has been detached, step 410 monitors the detached tab. Based on the monitoring, step 412 determines when the detached tab has become responsive again. Any suitable mechanism can be employed to monitor a detached tab. For instance, monitoring of the detached tab can occur in a manner comparable to monitoring of tabs for a shared queue as described above. In at least some embodiments, the message queue manager 111 can operate to send a heartbeat message to the detached tab and determine if the detached tab responds based on the heartbeat message.

When the detached tab becomes responsive, step 414 reattaches the tab. For instance, if message queue manager 111 receives a heartbeat message response from the detached tab or otherwise determines that the tab is responsive, the message queue manager 111 can cause the tab to be reattached to the shared queue. To perform the reattachment, step 416 merges messages for the tab from the detached queue to the shared queue. For instance, the message queue manager 111 can move messages from the detached queue back into the shared queue in the proper sequence with messages in the shared queue. Sequence information mentioned previously can be employed to combine the messages so that the messages are sequenced correctly. For instance, time stamps and/or priorities associated with messages can be used to re-order the messages when they are merged in the shared queue.

Once messages have been merged in step 416, step 418 clears the detached queue. This step can be performed to prepare the queue for use with another nonresponsive tab if the message queue manager 111 is configured to use the queue repeatedly. In embodiments in which the message queue manager 111 creates queues for nonresponsive tabs on demand, this step can involve closing, deleting, or otherwise shutting-down the detached queue. Another detached queue can then be created on demand for use with a different nonresponsive tab as appropriate.

The tab can now be considered reattached to the shared queue and message processing for the reattached tab, as well as for other tabs, is again handled via the shared queue.

Having described an example method in accordance with one or more embodiments, consider now an example system that can be employed to implement various techniques for message queue management in accordance with one or more embodiments

Example System

Figure 5:
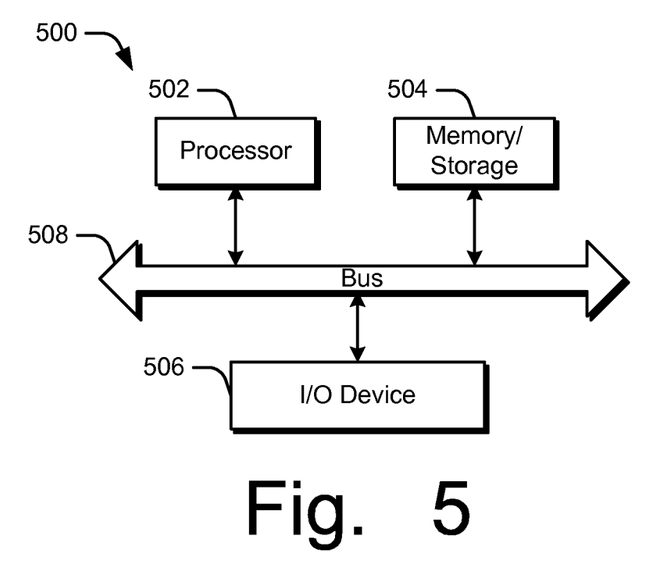
FIG. 5 illustrates an example system that can be used to implement one or more embodiments.

FIG. 5 illustrates an example computing device 500 that can be used to implement the various embodiments described above. Computing device 500 can be, for example, computing device 102 or web server 114 of FIG. 1.

Computing device 500 includes one or more processors or processing units 502, one or more memory and/or storage components 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer storage media. Component 504 can include volatile media (such as random access memory (RAM)) and/or non-volatile media (such as read only memory (ROM), Flash memory, optical disks, magnetic disks, and so forth). Component 504 can include fixed media (e.g., RAM, ROM, a fixed hard drive, etc.) as well as removable media (e.g., a Flash memory drive, a removable hard drive, an optical disk, and so forth).

One or more input/output devices 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide techniques for message queue management designed to reduce the likelihood of multi-component applications becoming nonresponsive (e.g., "locking-up", "hanging", "crashing", etc.) and enable recovery options for individual components if they do become nonresponsive. In at least some embodiments, a message queue manager can be implemented to detect when a component of an application interface becomes nonresponsive and detach the component from a shared message queue. The shared message queue can continue to process messages for other responsive components while messaging for the nonresponsive component is managed via a separate queue. The message queue manager can also notify a user regarding the nonresponsive component and provide the user with options to facilitate recovery of the nonresponsive component. Further, in at least some embodiments, the message queue manager can monitor a detached component and reattach the detached component when it becomes responsive again.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer readable hardware storage media storing instructions, that when executed by a computing device, cause the computing device to implement an message queue manager configured to perform acts comprising:
    managing a shared input message queue to process messages for multiple components of an application on the computing device;
    detecting a component of the multiple components on the computing device that is nonresponsive;
    responsive to the detecting, detaching the nonresponsive component from the shared input message queue;
    initiating a detached message queue; and
    assigning the detached message queue for dedicated use by the nonresponsive component, the detached message queue being employed to manage messaging for the nonresponsive component.

2. The one or more computer readable hardware storage media of claim 1, wherein the application comprises a web browser.

3. The one or more computer readable hardware storage media of claim 1, wherein the multiple components comprises multiple tabs of a tabbed interface for the application.

4. The one or more computer readable hardware storage media of claim 1, wherein the application comprises a web browser and the multiple components comprises multiple tabs of a tabbed interface for the web browser.

5. The one or more computer readable hardware storage media of claim 1, wherein detecting the nonresponsive component comprises:
    sending a message periodically to each of the multiple components to monitor responsiveness of the multiple components; and
    determining that the nonresponsive component fails to respond to the message.

6. The one or more computer readable hardware storage media of claim 1, wherein the message queue manager is further configured to perform acts comprising:
    outputting a notification to notify a user regarding the nonresponsive component, wherein the notification is non modal and output via a notification bar that overlays content that is rendered by the application in a content rendering area.

7. The one or more computer readable hardware storage media of claim 6, wherein the notification includes one or more user selectable instrumentalities configured to enable recovery options to recover the nonresponsive component.

8. The one or more computer readable hardware storage media of claim 1, wherein the multiple components comprise separately operable sub-applications that are contained within a common frame of the application.

9. The one or more computer readable hardware storage media of claim 1, wherein the message queue manager is further configured to perform acts comprising:
    while the component is nonresponsive, migrating a new message for the nonresponsive component to the detached message queue.

10. The one or more computer readable hardware storage media of claim 1, wherein the message queue manager is further configured to perform acts comprising:
    determining that the component detected as being nonresponsive is again responsive; and
    responsive to the determining, reattaching the component to the shared input message queue.

11. The one or more computer readable hardware storage media of claim 10, wherein reattaching the component comprises:
    merging messages for the component from a detached message queue into the shared input message queue; and
    clearing the detached message queue.

12. A computer implemented method comprising:
    sending, by a single computing device, a message periodically to multiple tabs of a tabbed application to monitor responsiveness of the multiple tabs, the multiple tabs configured to use a shared input message queue for message handling;
    detecting, by the single computing device, that a tab of the multiple tabs is nonresponsive based on the message;
    detaching, by the single computing device, the nonresponsive tab from the shared input message queue by migrating messages for the tab from the shared input message queue to a detached message queue;
    determining, by the single computing device, that the tab detected as nonresponsive is again responsive; and
    reattaching, by the single computing device, the tab to the shared input message queue by merging messages for the tab from the detached message queue into the shared input message queue, the reattaching being performed without requiring network activity.

13. The computer implemented method of claim 12, further comprising:
    outputting a notification to inform a user regarding the nonresponsive tab, and
    providing access to recovery options via one or more user selectable instrumentalities included in the notification, the recovery options being output in response to selection of the one or more user selectable instrumentalities included in the notification.

14. The computer implemented method of claim 13, wherein the recovery options include an option to swap a resource accessed via the nonresponsive tab with another resource.

15. The computer implemented method of claim 13, wherein the recovery options include an option to stop execution of script associated with the nonresponsive tab when execution of the script is identified as a cause of the nonresponsive tab.

16. The computer implemented method of claim 12, wherein the application comprises a web browser.

17. The computer implemented method of claim 12, wherein the migrating and the merging of messages between the shared input message queue and the detached message queue includes ordering the messages according to sequencing information associated with the messages.

18. A system comprising;
    one or more processing devices;
    one or more computer readable storage media embodying computer readable instructions that, when executed via the one or more processing devices, implement a message queue manager that is designed to be used in conjunction with a web browser, wherein the message queue manager is configured to:
    manage a shared input message queue to process messages for multiple tabs of the web browser;
    monitor responsiveness of the multiple tabs of the web browser by sending a message periodically to the multiple tabs;

detect that a tab of the multiple tabs is nonresponsive by determining that the tab fails to respond to the message; and detach the nonresponsive tab of the web browser from the shared input message queue by:

creating a detached message queue on at least one of the one or more processing devices that includes the web browser, to handle messages for the nonresponsive tab; and migrating messages for the tab from the shared input message queue to the detached message queue.

19. The system of claim 18, wherein the message queue manager is further configured to provide access to recovery options via one or more user selectable instrumentalities exposed via the web browser to recover the nonresponsive tab, the recovery options including at least:

an option to swap a resource accessed via the nonresponsive tab with another resource; and an option to stop execution of script associated with the nonresponsive tab when execution of the script is detected as a potential cause of the nonresponsive tab.

20. The system of claim 18, wherein the message queue manager is further configured to:

determine that the tab detected as nonresponsive is again responsive; and reattach the tab to the shared input message queue by:

merging messages for the tab from the detached message queue into the shared input message queue; and deleting the detached message queue.

21. The one or more computer readable storage media of claim 6, wherein the notification includes an information portion that identifies a page name, a uniform resource locator (URL), domain name, or an identifier associated with the nonresponsive component.

* * * * *